United States Patent
McGrath et al.

(10) Patent No.: US 7,123,816 B2
(45) Date of Patent: Oct. 17, 2006

(54) AUDIO AND/OR VIDEO GENERATION APPARATUS AND METHOD OF GENERATING AUDIO AND/OR VIDEO SIGNALS

(75) Inventors: Mark John McGrath, Bracknell (GB); Andrew Collins, Basingstoke (GB); Martin Rex Dorricott, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1158 days.

(21) Appl. No.: 09/795,538

(22) Filed: Feb. 28, 2001

(65) Prior Publication Data

US 2001/0019657 A1 Sep. 6, 2001

(30) Foreign Application Priority Data

Mar. 1, 2000 (GB) ................................. 0004973.4

(51) Int. Cl.
*H04N 7/04* (2006.01)
*H04N 7/00* (2006.01)

(52) U.S. Cl. .......................................... 386/95; 386/46
(58) Field of Classification Search .................. 386/95, 386/46, 96, 104, 105, 106, 107, 117, 52, 55, 386/54, 39, 69, 81, 82 A; 360/32, 13
See application file for complete search history.

(56) References Cited

U.S. PATENT DOCUMENTS 5,515,101 A 5/1996 Yoshida
5,568,205 A 10/1996 Hurwitz (Continued)

FOREIGN PATENT DOCUMENTS

EP 0 241 014 10/1987

(Continued)

OTHER PUBLICATIONS

Morgan O: "Wrappers and Metadata Sub Group digital video standards" IEEE Colloquium on the EBU-SMPTE Task Force: Building an Infrastructure for Managing Compressed Video Systems, IEEE, London,BG, 1997, pp. 5-1-5-7, XP002127283.

*Primary Examiner*—Robert Chevalier
(74) *Attorney, Agent, or Firm*—Oblon, Spivak, McClelland, Maier & Neustadt, P.C.

(57) ABSTRACT

An audio and/or video generation apparatus is arranged in operation to generate audio and/or video signals representative of an audio and/or video source has a meta data generation tool which is arranged in operation to generate meta data associated with the audio and/or video signals, wherein the type of meta data generated by the meta data generation tool is user selectable. The audio and/or video generation apparatus may comprise a recording means which is arranged in operation to record the audio and/or video signals on a recording medium, and the audio and/or video generation apparatus may be arranged to receive meta data associated with the audio and/or video signals generated by a data processor, the recording means being arranged in operation to record the meta data on the recording medium with the audio and/or video signals. The meta data may be user generated, such as text describing the audio/video signals, or may be secondary meta data which is automatically generated by the audio/video apparatus. The recording medium may be a linear recording medium, and the recording means may be arranged in operation to record at least one of the user generated meta data and the secondary meta data on the recording medium after the audio and/or video signals at a position at which at least one of the user generated and secondary meta data can be read by a reproducing means before the audio and/or video signals.

18 Claims, 4 Drawing Sheets

U.S. PATENT DOCUMENTS

| | | | |
|---|---|---|---|
| 5,872,887 A | 2/1999 | Walker | |
| 5,910,825 A | 6/1999 | Takeuchi | |
| 2004/0073947 A1* | 4/2004 | Gupta | 725/134 |

FOREIGN PATENT DOCUMENTS

| | | |
|---|---|---|
| EP | 0 581 601 | 2/1994 |
| EP | 0 949 621 | 10/1999 |
| EP | 0 982 947 | 3/2000 |
| EP | 1 083 568 | 3/2001 |
| GB | 2 312 078 | 10/1997 |
| GB | 2 318 204 | 4/1998 |
| GB | 2 329 509 | 3/1999 |
| GB | 2 347 834 | 9/2000 |
| WO | WO 98/57251 | * 12/1998 |
| WO | WO 98 57251 | 12/1998 |
| WO | WO 99 04557 | 1/1999 |

* cited by examiner

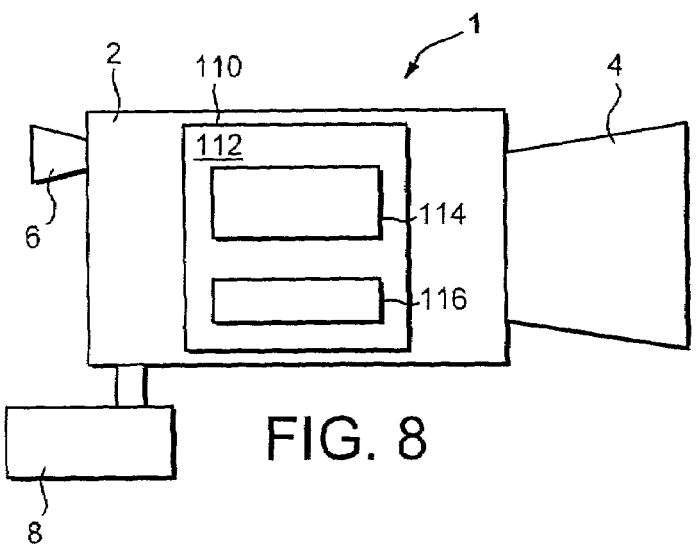
FIG. 8
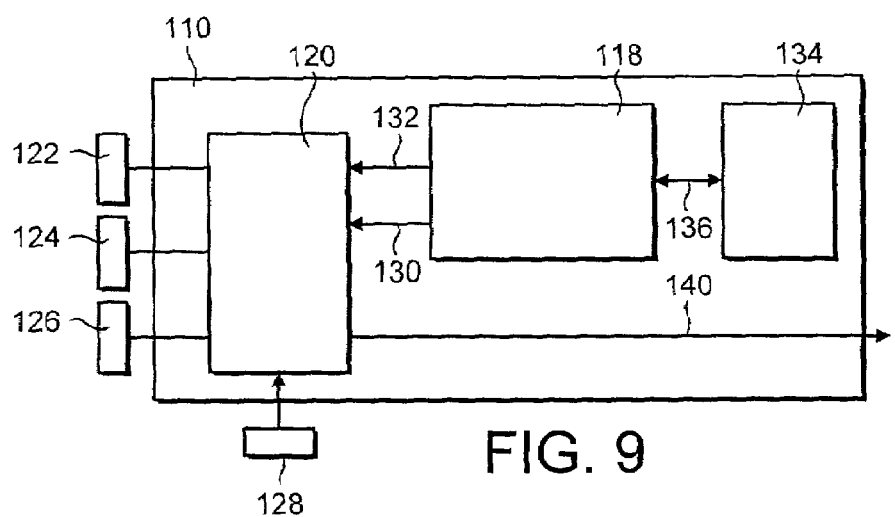
FIG. 9
| | TIME | DATE | GPS | FSTOP | REC | TEXT |
|---|---|---|---|---|---|---|
| SELT1 | X | X | | | | X |
| SELT2 | | | X | | X | |
| SELT3 | | X | | X | X | X |
| DEFLT | | X | | | X | |
FIG. 10

AUDIO AND/OR VIDEO GENERATION APPARATUS AND METHOD OF GENERATING AUDIO AND/OR VIDEO SIGNALS

FIELD OF THE INVENTION

The present invention relates to audio and/or video generation apparatus and methods of generating audio and/or video signals. The present invention also relates to methods of recording audio and/or video signals.

In preferred embodiments the audio and/or video generation apparatus is a video camera, camcorder or television camera or the like.

BACKGROUND OF THE INVENTION

The subject matter and content of audio and video productions varies greatly. In addition, to this variety there is, correspondingly, a considerable quantity of such audio and video productions. The quantity has been required to meet the demand from the broadcast and entertainment industries. The audio productions include, for example, radio broadcasts, both live and pre-recorded, musical and audio recordings, whereas video productions include, for example, films, television programs and video recordings. As will be appreciated typically video productions also include an accompanying sound track or commentary, so that an audio production is inherently included as part of the video production.

The term audio and/or video will be used herein to refer to any from of audio information or signals, video information or signals, or a combination of video and audio information or signals. The term audio/video will be used for short to refer to audio and/or video.

As a result of the great variety and considerable quantity of audio/video productions, the task of locating particular content items of audio/video material within an archive of audio/video productions represents an arduous and labour intensive task, because an operator must visually search the audio/video productions for the desired content item. Furthermore, because of the length of audio/video productions which are typically although not exclusively stored on linear recording media, the task of navigating through the media to locate particular content items of audio/video material from an audio/video production is time consuming and labour intensive.

In our co-pending UK patent application number GB 9921235.9 there is disclosed a method and apparatus for navigating through the content of audio/video material using metadata which represents the content of the audio/video material.

The term metadata as used herein refers to and includes any form of information or data which serves to describe either the content of audio/video material or parameters present or used to generate the audio/video material or any other information associated with the audio/video material. Metadata may be, for example, "semantic metadata" which provides contextual/descriptive information about the actual content of the audio/video material. Examples of semantic meta data are the start of periods of dialogue, changes in a scene, introduction of new faces or face positions within a scene or any other items associated with the source content of the audio/video material. The metadata may also be syntactic metadata which is associated with items of equipment or parameters which were used whilst generating the audio/video material such as, for example, an amount of zoom applied to a camera lens, an aperture and shutter speed setting of the lens, and a time and date when the audio/video material was generated. Although meta data may be recorded with the audio/video material with which it is associated, either on separate parts of a recording medium or on common parts of a recording medium, meta data in the sense used herein is intended for use in navigating and identifying features and essence of the content of the audio/video material, and may, therefore be separated from the audio/video signals when the audio/video signals are reproduced. The meta data is therefore separable from the audio/video signals.

The apparatus and method for navigating through the content of audio/video material disclosed in the co-pending UK patent application number GB 9921235.9 uses the meta data which has been generated with the audio/video signals to navigate through the items of contextual or essence information of the audio/video material.

In a further co-pending UK patent application number 9921234.2 there is disclosed an editing system for editing source content such as audio/video material to produce an edited audio/video production by applying a template representative of a desired production style to meta data associated with the audio/video material to form the production. Again the meta data must be generated with the audio/video material in order for the editing system to form the audio/video production.

SUMMARY OF THE INVENTION

According to the present invention there is provided an audio and/or video generation apparatus which is arranged in operation to generate audio and/or video signals representative of an audio and/or video source having a meta data generation tool which is arranged in operation to generate meta data associated with said audio and/or video signals, wherein the type of meta data generated by said meta data generation tool is user selectable.

As discussed above there is a great variety in the nature and content of audio/video productions. The audio/video productions are created from audio/video material generated using, for example, video cameras, television cameras as well as computer generating graphics and animation processors. As such because of the variety in the nature and content of audio/video productions, the type and nature of metadata which is to be associated with the audio/video material correspondingly differs. Furthermore although it has been known to associate metadata with audio/video productions for facilitating asset management for archiving the audio/video productions, as indicated in our co-pending patent applications mentioned above, is proposed to use metadata for facilitating the creation of the audio/video productions by editing and navigating through the content of the audio/video material. An improvement in the creation of audio/video productions is therefore gained by providing a metadata generation tool which has a facility for allowing a user to select a type of metadata which is generated by the tool in association with the audio/video material produced. In this way the metadata can be adapted to the nature and subject of the audio/video production to which the audio/video signal source content is to be applied.

To facilitate selection of the metadata to be associated with the audio/video signals the metadata generation tool may be arranged to generate metadata of a plurality of different types and the metadata generation tool may be provided with a user interface for selecting at least one of the plurality of different types of metadata, the metadata being generated in operation from the audio/video signals in accordance with the user selected metadata types.

Thus, whilst it is conceivable that the audio/video generation apparatus may be provided with a facility for generating any type of metadata, in a preferred embodiment the metadata generated by the audio/video generation apparatus may be of a predetermined plurality of types, which may be may selected by the user using the user interface. Furthermore in order to ensure that at least some metadata is generated with the audio/video signals generated by the apparatus in case the user neglects to select a metadata type, the metadata generation tool may be arranged to generate metadata of a default type in absence of a user selecting from the plurality of metadata types.

Advantageously the meta data generation tool may be arranged to generate meta data in accordance with a plurality of pre-determined meta data selections, each of which specifies at least one of the plurality of different meta data types arranged in a pre-determined format, the user interface being arranged to provide the user with a facility for selecting one of the meta data selections for generating the meta data. The plurality of different meta data selections may be arranged in accordance with a standard defining the type and format of metadata associated with the audio/video signals.

In order to provide a unified form of metadata which is common within the audio/video production industry, standards are being developed for metadata for example by SMPTE-EBU (Society of Motion Picture and Television Engineers-European Broadcast Union) and by MPEG-7 (Motion Picture Expert Group, which is an ISO-IEC standards body SG29/WG11). As such by providing the metadata generation tool with a facility for selecting one of a plurality of pre-defined meta data selections, the selections being defined in accordance with a standard such as for example that proposed by SMPTE-EBU then the user may select an appropriate standard for the type of audio/video material being generated by the audio/video generation apparatus.

Although the audio/video signals generated by the apparatus may be broadcast directly with the metadata from a remote location, advantageously the audio and/or video generation apparatus may further comprise a recording/reproducing apparatus which is arranged in operation to record the audio and/or visual information signals onto a recordable medium with the metadata.

In a preferred embodiment the audio and/or video generation apparatus may be a video camera, camcorder, television camera, cinema camera or the like.

According to an aspect of the present invention there is provided a meta data generation tool for use in generating metadata in association with an audio and/or visual generation apparatus, the tool being arranged in operation to generate meta data associated with audio and/or video signals, wherein the type of meta data generated by said tool is selectable.

According to a further aspect of the present invention there is provided a method of generating audio and/or video information signals, comprising the steps of identifying the nature of the audio and/or video information signals to be generated, selecting appropriate types of meta data to be generated with the audio and/or video signals, and generating the meta data of the selected type in association with the audio and/or video information signals.

According to a further aspect of the present invention there is provided an audio and/or video generation apparatus which is arranged in operation to generate audio and/or video signals representative of an audio and/or video source, the audio and/or video generation apparatus comprising a recording means which is arranged in operation to record the audio and/or video signals on a recording medium, wherein the audio and/or video generation apparatus is arranged to receive metadata associated with the audio and/or video signals generated by processor, the recording means being arranged in operation to record the metadata on the recording medium with the audio and/or video signals.

An audio/video generation apparatus which is arranged to receive metadata generated by a data processor is provided with an improved facility for introducing metadata associated with audio/video signals generated by the audio/video apparatus.

Furthermore, the audio/video generation apparatus may be provided with a user interface having a predetermined format for connecting the audio and/or video generation apparatus to the data processor. The interface therefore provides a facility for the data processor to be connected to the audio and/or video generation apparatus using the interface. The predetermined format may be of a common type thereby providing a facility for a range of possible data processors to be connected to the audio/video generation apparatus. As such, the data processor provides a facility for a user to generate metadata and for including this metadata with the audio and/or video signals generated by the audio/video generation apparatus. The metadata may be recorded separately on the recording medium, from the audio and/or video signals.

A further improvement is provided to the audio and/or video generation apparatus by providing a metadata generator coupled to the recording means, the metadata generator being arranged in operation to generate secondary metadata associated with the audio and/or video signals, wherein the user generated metadata and the secondary metadata are arranged to be recorded in combination on the recording medium. As such the metadata generator which is embodied within the audio and/or video generation apparatus provides a facility for automatically generating the secondary metadata which is therefore associated with the audio/video signals.

The secondary metadata may be semantic metadata representative of operating parameters of the audio and/or video generation apparatus when the audio and/or video signals are generated.

In a preferred embodiment the user generated metadata may be text information. Furthermore the secondary metadata may be stored in a data store and combined with the user generated metadata by a control processor and recorded onto the recording medium by the recording means.

The data processor may have a speech conversion processor which is arranged in operation to generate the text information by converting sound signals representative of spoken communication by the user into the text information. This provides a further improvement in facilitating the generation of the user generated meta data in that although the data processor may be provided with an alpha numeric key pad for generating the user generated metadata, by providing a speech conversion processor, the user may speak the desired meta data to be associated with the audio/video material from which the metadata is generated and recorded on the recording medium. In one embodiment therefore the data processor may be a personal computer. In another embodiment, the data processor may be a personal digital assistant such as a PSION (TM) or a PALM PILOT (TM) or the like. In other embodiments the audio and/or video generation apparatus may be a video camera, a television camera or a camcorder or the like.

The recording medium may be a linear recording medium and the recording means may be arranged in operation to record at least one of the user generated meta data and the secondary metadata on the recording medium after the audio and/or video signals at a position at which the at least one of the user generated metadata and the secondary metadata can be read by a reproducing means before the audio and/or video signals.

According to a further aspect of the present invention there is provided a method of recording audio and/or video signals comprising the steps of recording the audio and/or video signals on a recording medium, generating automatically meta data in response to said audio and/or video signals, providing user generated meta data associated with said audio and/or video signals, and recording said meta data on said recording medium with said audio and/or video signals.

According to a further aspect of the present invention there is provided an audio and/or video generation apparatus which is arranged in operation to generate audio and/or video signals representative of an audio and/or visual source, the audio and/or video apparatus comprising a recording means which is arranged in operation to record the audio and/or video signals on a recording medium, wherein the recording medium is a linear recording medium, and the recording means is arranged in operation to record metadata associated with the audio and/or video signals on the recording medium after the audio and/or video signals at a position at which the metadata can be read by a reproducing means before the audio and/or video signals.

According to a further aspect of the present invention there is provided a method of recording audio and/or video material comprising the steps of generating audio and/or video signals representative of audio and/or video material from an audio and/or visual source, recording the audio and/or video signals on a linear recording medium and recording metadata associated with the audio and/or video signals on the recording medium after the audio and/or video signals at a position at which the metadata can be read by a reproducing means before the audio and/or video signals.

Further aspects and features of the present invention are defined in the appended claims.

BRIEF DESCRIPTION OF THE DRAWINGS

Embodiments of the present invention will now be described by way of example with reference to the accompanying drawings wherein:

FIG. 8 is a schematic block diagram of a video camera embodying a meta data generation tool, FIG. 9 is a schematic block diagram of a meta data generation tool shown in FIG. 8, and FIG. 10 is a table representing examples of pre-defined meta data selections.

DESCRIPTION OF PREFERRED EMBODIMENTS

Figure 1:
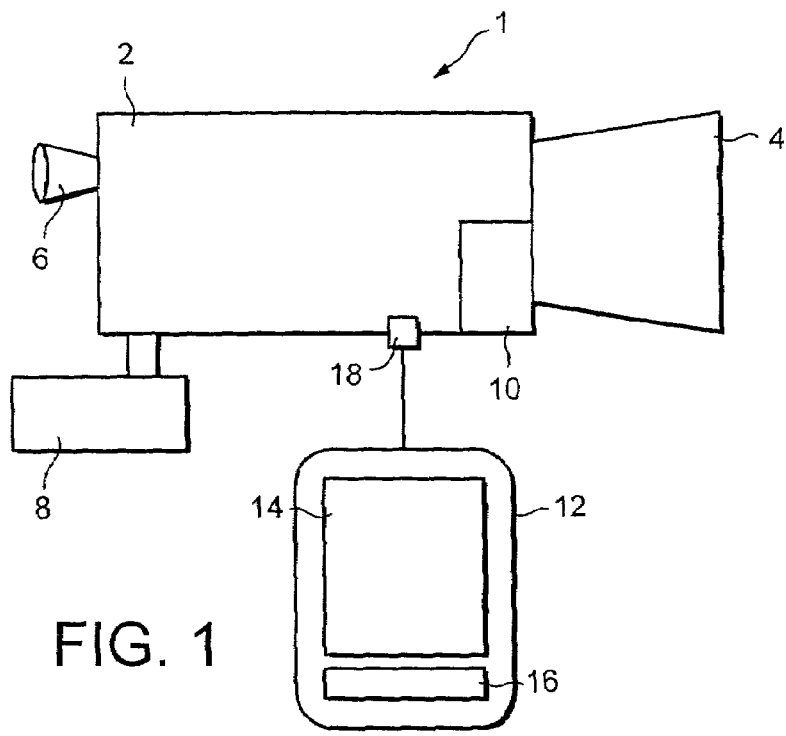
FIG. 1 is a schematic block diagram of a video camera operatively coupled to a personal digital assistant.

As will be understood from the introduction and discussion above, embodiments of the present invention relate to audio and/or video generation apparatus which may be for example television cameras, video cameras or camcorders. As a first illustration of an embodiment of the present invention, FIG. 1 provides a schematic block diagram of a video camera which is arranged to be connected to a personal digital assistant. A personal digital assistant is an example of a data processor which may be arranged in operation to generate metadata in accordance with a user's requirements. The term personal digital assistant is known to those acquainted with the technical field of consumer electronics as a portable or hand held personal organiser or data processor including an alpha numeric key pad and may also include a hand writing interface. In FIG. 1 a video camera 1 is shown to comprise a camera body 2 which is arranged to receive light from an image source falling within a field of view of an imaging arrangement 4 which may include one or more imaging lenses (not shown). The camera also includes a view finder 6 and an operating control unit 8 from which a user can control the recording of signals representative of the images formed within the field of view of the camera. The camera 1 also includes a microphone 10 which may be a plurality of microphones arranged to record sound in stereo. Also shown in FIG. 1 is hand personal digital assistant 12 which has a screen 14 and an alphanumeric key pad 16 which also includes a portion to allow the user to write characters recognised by the personal digital assistant. The personal digital assistant 12 is arranged to be connected to the video camera 1 via an interface 18. The interface 18 is arranged in accordance with a predetermined standard format such as, for example an RS232 or the like. The interface 18 provides a facility for receiving metadata generated using the personal digital assistant 12 which can be recorded with the audio and video signals detected and captured by the video camera 1. A better understanding of the operation of the video camera 1 in combination with the personal digital assistant 12 may be gathered from FIG. 2 which shows a more detailed representation of the body of the video camera 2 which is shown in FIG. 1 and in which common parts have the same numerical designations.

Figure 2:
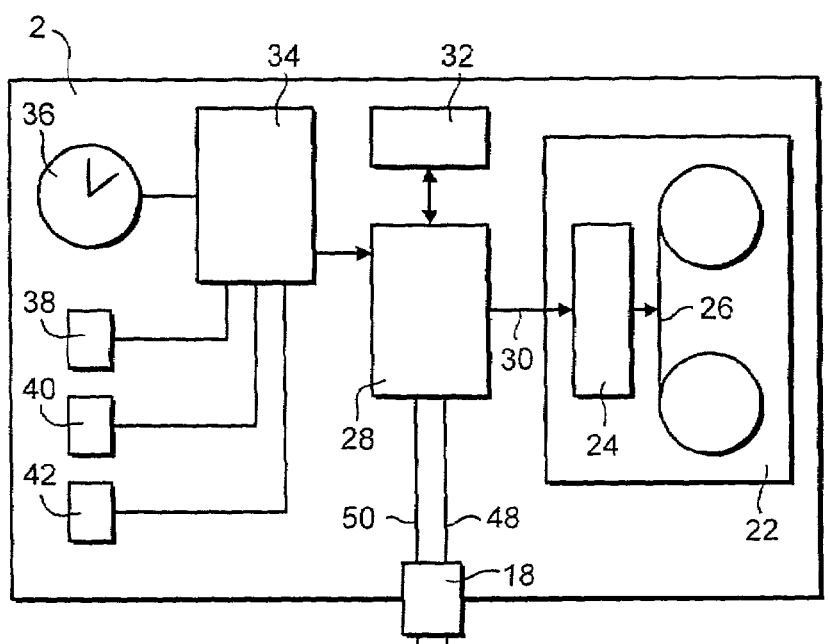
FIG. 2 is a schematic block diagram of the body of the video camera shown in FIG. 1.

In FIG. 2 the camera body 2 is shown to comprise a tape drive 22 having read/write heads 24 operatively associated with a magnetic recording tape 26. Also shown in FIG. 2 the camera body includes a control processor 28 coupled to the tape drive 22 via a connecting channel 30. Also connected to the control processor 28 is a data store 32 and a secondary metadata generator 34. The secondary metadata generator 34 is connected to a clock 36 and three sensors 38, 40, 42. The interface unit 18 is also shown in FIG. 2 to receive first and second connecting channels 44 and 46. Correspondingly two connecting channels connect the interface unit 18 to the control processor 28 via corresponding connecting channels 48 and 50.

The video camera 1 shown in FIG. 1 operates to record visual information falling within the field of view of the lenses arrangement 4 onto a recording medium. The visual information is converted by the camera into video signals. In combination, the visual images are recorded as video signals with accompanying sound which is detected by the microphone 10 and arranged to be recorded as audio signals on the recording medium with the video signals. As shown in FIG. 2, the recording medium is a magnetic tape 26 which is arranged to record the audio and video signals onto the recording tape 26 by the read/write heads 24. The arrangement by which the video signals and the audio signals are recorded by the read/write heads 24 onto the magnetic tape 26 is not shown in FIG. 2 and will not be further described as this does not provide any greater illustration of the example embodiment of the present invention. However once a user has captured visual images and recorded these images using the magnetic tape 26 as with the accompanying audio signals, metadata describing the content of the audio/video signals may be input using the personal digital assistant 12. As shown in FIG. 2 the interface unit 18 provides a facility whereby the metadata added by the user using the personal digital assistant 12 may be received within the camera body 2. Data signals representative of the user generated metadata are received via the connecting channels 44, 46 at the interface unit 18. The interface unit 18 serves to convert these signals into a form in which they can be processed by the control processor 28 which receives these data signals via the connecting channels 48, 50.

Secondary metadata is also generated by the secondary metadata generator 34. In the example embodiment illustrated in FIG. 2, the secondary metadata includes time codes which are generated with reference to the clock 36. The secondary metadata may also include the aperture setting of the camera lens 4, the shutter speed 40 and a signal received via the control unit 8 to indicate that the visual images captured are a "good shot". These signals and data are generated by the sensors 38, 40, 42 and received at the secondary metadata processor 34. In combination therefore in the example embodiment the secondary metadata generate 34 is arranged to produce syntactic metadata which defines and provides operating parameters which are used by the camera in generating the video signals. The secondary or syntactic metadata is therefore also fed to the control processor 28.

In the example embodiment shown in FIGS. 1 and 2, the syntactic metadata is generated automatically at the time and during the generation of the video signals. However a remaining technical problem is how to record the secondary metadata on the magnetic tape 26. In the example embodiment shown in FIG. 2, the control processor 28 is provided with the data store 32. Therefore during the process of capturing the video signals, the control processor 28 stores the secondary metadata in the data store 32. At the time at which the user has finished recording the video signals which serve to capture a particular event, then the user may generate metadata using the personal digital assistant 12. Once the user generated metadata is received within the control processor 28, the user generated metadata is combined with the secondary metadata stored in the data store 32 and written onto the magnetic tape 26 using the read/write heads 24 by feeding appropriate signals via the connecting channel 30. In combination therefore a user is provided with a convenient and improved facility for adding metadata to the audio/video material generated by the video camera 1.

Examples of automatically generated secondary metadata are good shot markers, Rec marks (indicating where recording starts/stops), GPS location, Time and Date, UMID (Unique Material Identifier), Camera settings, focus, zoom, etc. Examples of metadata added by the user manually associated with the source content after it has been created, are for example Cameraman, Journalist Notes, Style comments, Suggestions, Annotations, Location/Assignment comments, Shot identification such as Intro, Finish, Commentary, Voice Over, etc. In addition, there is much development in progress directed to the automatic extraction of metadata from the content, for example by using recognition tools, for example face and feature detection tools, speech recognition tools etc., to identify features within the content, and thereby enable appropriate metadata to be added.

Figure 3:
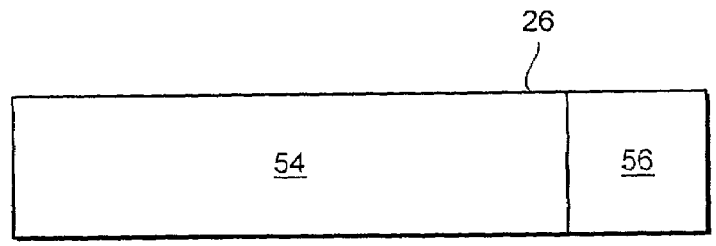
FIG. 3 is an example representation of information recorded onto a magnetic tape.

A further advantageous feature of the example embodiment of the present invention is illustrated with reference to FIG. 3. In FIG. 3 an illustration is shown of a section of the magnetic tape 26 upon which the audio/video signals and the metadata have been recorded. As shown in FIG. 3, the audio/video signals are recorded first in a first portion 54 whereas the combined user generated and secondary metadata is recorded onto a later portion of the magnetic tape 56. Furthermore the control processor operates in combination with the recording heads 24 to record the user generated and secondary metadata at a position at which the metadata will be read first by a reproducing or video scanning or playing apparatus before the audio/video signals recorded in the portion 54. This provides a particular advantage in that an editor is provided with a rapid indication of the content of the audio/video source information present on the tape 56.

Figure 4:
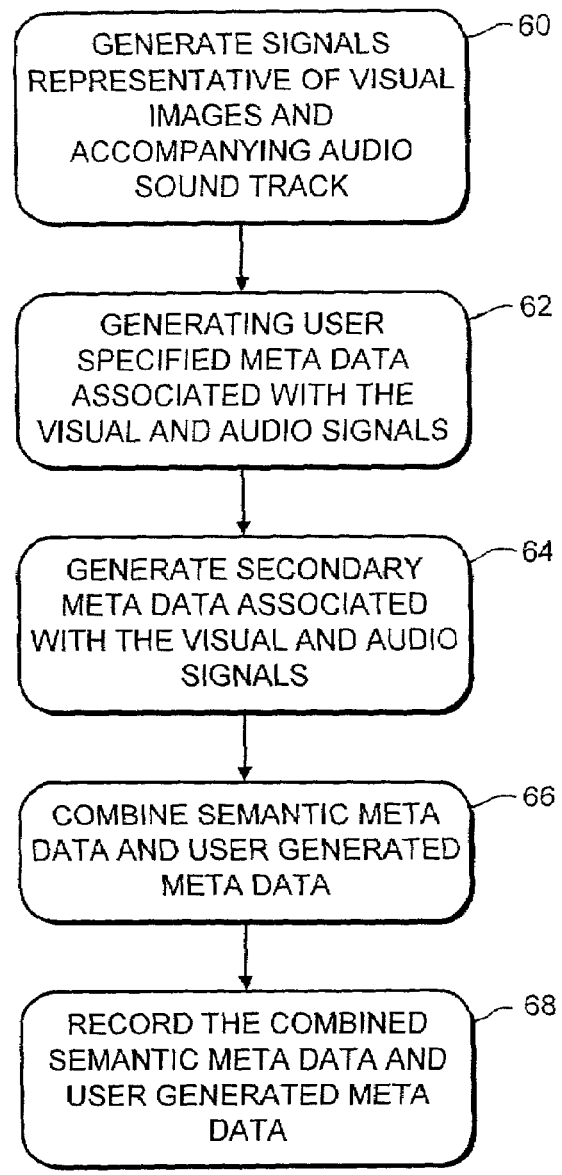
FIG. 4 is a flow diagram representing a method for recording audio/video material.

The process by which metadata is produced using the personal digital assistant 12 and combined with the secondary metadata to form part of the recording of the audio/video signals is illustrated with reference to a flow diagram shown in FIG. 4. In FIG. 4 a first step in the operation of the process is that the video camera 1 generates audio/video signals representative of the visual images captured by the camera and the accompanying audio sound track. This is represented by process step 60. After the audio/video signals have been generated, the user specifies metadata which is to be added to the audio video signals and generates this user generated metadata using the personal digital assistant 12. This is performed at the processor step 62. During the capture of the audio/video signals, the camera 1 operates to automatically generate the secondary metadata which is associated with the audio/video signals and this is performed by process step 64. The secondary metadata and the user generated metadata are then combined in a process step 66 and in the final process step 68, the combined semantic metadata and user generated metadata are recorded onto the magnetic tape 26.

Figure 5:
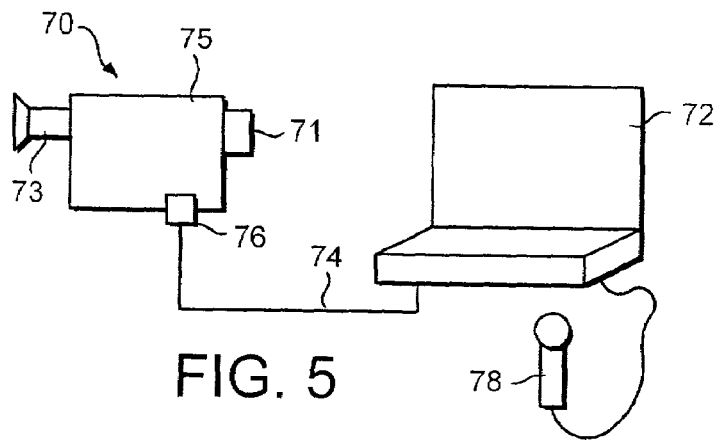
FIG. 5 is a schematic block diagram of an arrangement in which a camcorder is connected to a personal computer.

A second embodiment of the present invention is shown in FIG. 5 in which a camcorder 70 is connected to a personal computer 72. The camcorder 70 is connected to the personal computer 72 via a connecting channel 74 and an interface unit 76. As with the first embodiment, the interface unit 76 may be arranged in accordance with a predetermined format, and may correspond to a standardised interface thereby allowing a facility for the camcorder 70 to be connected to any form of data processor of which the personal computer 72 is just one example. As with the first embodiment, the interface unit 76 serves to provide a facility by which metadata may be introduced into the camcorder 70 to be recorded with audio/video signals generated by the camcorder. However, also shown in FIG. 5 is a microphone 78. In the second embodiment shown in FIG. 5, the personal computer 72 is arranged to operate a speech conversion or dictation application program which provides a facility for converting words spoken into the microphone 78 by the user into text. In this way the user may speak desired metadata into the microphone 78 which may be converted into the text metadata and fed via the connecting channel 74 to the interface unit 76. The metadata is then recorded onto the recording medium used by the camcorder as shown in more detail in FIG. 6.

Figure 6:
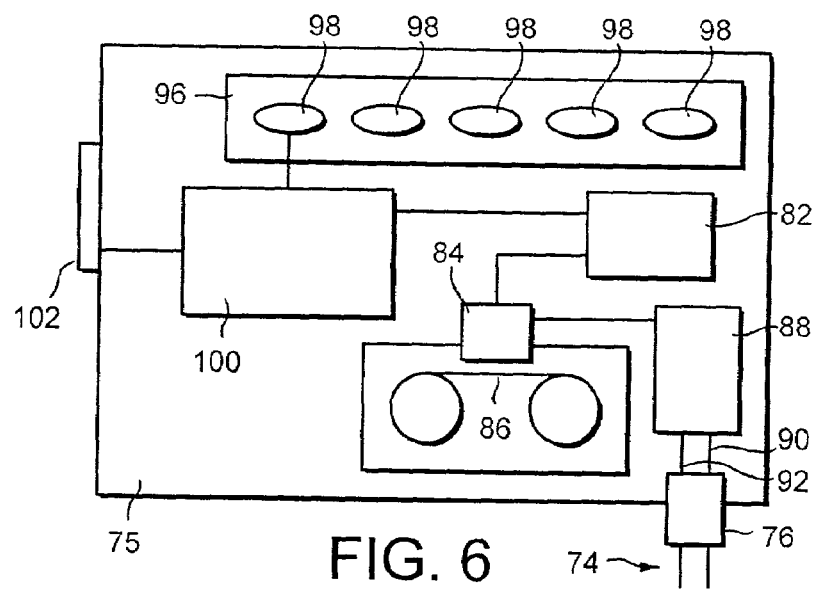
FIG. 6 is a schematic block diagram of the body of the camcorder shown in FIG. 3.
Figure 7:
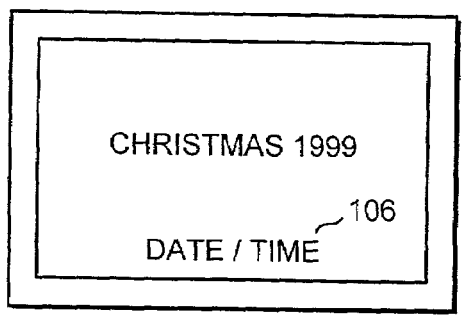
FIG. 7 is a representation of an image formed by the camcorder.

FIG. 6 provides a more detailed block diagram of the camcorder body 75 which is shown in FIG. 5. The camcorder body 75 is shown to comprise an image processing unit 82 which is arranged to convert images formed by the imaging lens 71 into video signals representative of the images and also to combine these video images with audio signals detected by a microphone of the camcorder (not shown). These audio/video signals are generated by the processor 82 and fed to a tape driving processor 84 which includes recording heads and operates to record the audio/video signals onto a magnetic tape 86. Also shown in FIG. 6 is the interface unit 76 which is connected to two connecting conductors which form the connection channel 74. The interface unit 76 is correspondingly connected to a metadata control processor 88 via two conductors 90, 92. The metadata controller 88 is connected to the tape dive controller 84 via a connecting channel 94. The camcorder is also provided with a user interface through which commands may be input. A user interface 96 is shown in FIG. 6 to have five control buttons 98 thorough which commands may be input. One of these operating buttons 98 is connected to a text building unit 100 which is also connected to the image processor 82. The text building unit 100 also receives signals generated from a jog shuttle input device 102 via a connecting channel 103. The text building unit 100 is triggered in a conventional camcorder by one of the operating buttons 98 forming the user interface unit 96. This provides a facility through which a user may generate text such as a title or summary of the images captured by the camcorder. The letters of each word are selected using the jog-shuttle device 102 in order to introduce the desired text. An example of this is shown in FIG. 7 which provides an illustrative representation of the image formed by the camcorder and which would be viewed in the view finder 73. Here the title "Christmas 1999" is shown superimposed on the images captured within the field of view of the camcorder lens 71. The title "Christmas 1999" shown at a central position 104 within the screen is therefore superimposed with the images captured or shot by the camcorder 70 and recorded with these images onto the magnetic tape 86. Similarly as shown in FIG. 7, conventional camcorders have a facility for adding the date/time 106 to the images captured by the camcorder, which form part of the image and therefore the video signals. In contrast however in accordance with the second embodiment of the present invention the text generated from the personal computer 72 and received at the interface unit 76 is processed by the metadata processor 88 and if appropriate stored until an appropriate command is triggered after the desired images represented by the audio/video signals have been recorded onto the magnetic tape 86. After the audio/video signals have been recorded, the metadata is fed from the metadata processor 88 to the tape driving processor 84 via the connecting channel 94 and are recorded onto the magnetic tape 86 after the audio/video signals. As such in preferred embodiments the metadata is recorded at the first position on the magnetic tape which would be read by a playing or editing unit so that an editor is provided with improved knowledge of the content of the magnetic tape 86. Thus the text generated as metadata is distinguished from the textual information of the summary or title of the audio/video signals 104 or the date/time 106 generated by the text building unit 100 in that the summary, title or the date/time 106 are recorded with the audio video/signals and as such form part of these audio/video signals. The user generated metadata in contrast is separable from the audio/video signals and so is recorded separate from and distinct to the title, summary and date/time of the images.

A third example embodiment of the present invention is shown in FIG. 8 embodied within a video camera 1 which corresponds substantially to the video camera which is shown in FIG. 1 and so the parts of the video camera 1 shown in FIG. 8 which are common to FIG. 1 bear the same numerical designations. For brevity only the differences between the video camera shown in FIG. 8 and the video camera shown in FIG. 1 will be described. The video camera shown in FIG. 8 is provided with a metadata generation tool 110 which forms part of the video camera 1. However as will be appreciated the metadata generation tool 110 could be formed separately from the video camera 1 and connected to the video camera 1 via an appropriate interface. Equally however the metadata generation tool could be connected to any other form of audio and/or video generation apparatus such as a camcorder or computer graphics tool or the like. The metadata generation tool is provided with a user interface 112 having a screen 114 and a keypad 116. The keypad provides a means via which the user may enter commands and text which are received by a user interface data processor which will be described shortly. A more detailed diagram of the metadata generation tool shown in FIG. 8 is provided by a schematic block diagram shown in FIG. 9. In FIG. 9 the metadata generation tool 110 is shown to have a user interface data processor 118 which is operatively coupled to the screen 114 and the keypad 116 of the user interface 112 of the metadata generation tool although this is not shown in FIG. 9. The metadata generation tool 110 is shown in FIG. 9 to have a metadata processor 120 coupled to four metadata generation sensors 122, 124, 126, 128. The user interface data processor 118 is connected to the metadata processor 120 by a control channel 130 and a metadata channel 132. Also connected to the user interface data processor 118 is a data store 134 via a connecting channel 136.

In operation the metadata processor operates to receive signals from the metadata sensors 122, 124, 126, 128 which are representative of values of parameters which are identified as metadata and which are generated in association with the audio/video signals generated by for example the video camera 1. The user interface data processor 118 is arranged to receive commands from the user via the keypad 116 which indicate which of a plurality of types of metadata the user wishes to generate with the audio/video signals which are recorded in association with the audio/video signals by the video camera 1. An example of possible metadata types is shown in a table in FIG. 10. In FIG. 10 the first row provides an indication of six possible metadata types which are "Time" which is the time at which the audio/video signals are generated, "Date" which is the date at which the audio/video signals are generated, a location at which the audio/video signals are generated as provided by a "GPS" (Global Positioning System) data value, "F Stop" which is representative of the aperture setting of the video camera when the audio/video signals were generated, "Rec" which is representative of a point at which recording starts and stops, and finally "Text" which is a text value input by the user via the keypad 116 which the user is free to provide and which is indicative of some value that the user considers important.

Whilst the user is free to select any of the metadata types available to the video camera, as shown in FIG. 10 the metadata types are divided into three metadata selections. Each of these selections is represented as a corresponding row of the table and indicated as selection 1 SEL1, selection 2 SEL2, selection 3 SEL3 and finally a default setting DEFLT. The type of metadata generated for each of the selections is indicated by a corresponding cross X in the table cell below the column which indicates the metadata type. So for example for selection 1 SEL1 the time, date and text will be generated as metadata. The user is arranged to select one of the selections by inputting appropriate commands via the keypad 116 and the user's desired selection is represented on the screen 114. The desired selection is processed by the user interface data processor 118 which further operates to communicate control signals representative of this desired selection to the metadata processor 120. The metadata processor 120 is therefore correspondingly configured to generate the metadata values for each of the metadata types from the signals received from the metadata sensors 122, 124, 126, 128. The metadata processor 120 then operates to generate signals representative of the selected values which are output by the metadata generation tool 110 at an output channel 140 to be associated with the audio/ video signals. If the user selects a selection which allows for text to be added as metadata, then the text may be prompted by the user interface data processor 118 which may be input via the keypad 116 and stored in the data store 134. The data store 134 may also serve to store the metadata selection the user has selected. Signals representative of a user input text are then fed via the metadata channel 132 from the user interface data processor 118 to the metadata processor 120.

Whilst the range of different types of metadata may be very large and the format in which the metadata is generated may also vary greatly, the SMPTE-EBU is currently investigating and standardising different types and formats for metadata. As such one or more of the categories which may be available to the user via the user interface may correspond to one of the plurality of predetermined standards. In this way the user may select the metadata standard which is most appropriate for the type of audio/video signals which are being generated and will be recorded to represent the content of the audio/video source. The metadata standard is used to produce and to facilitate editing of the audio/video signals to produce an audio/video production.

As will be appreciated by those skilled in the art various modifications may be made to the embodiments herein before described without departing from the scope of the present invention. For example whilst embodiments have been described with recording audio/video onto magnetic tape, it will be appreciated that other recording media are possible. Furthermore although the user generated metadata has been represented as text information, it will be appreciated that any other forms of metadata may be generated either automatically or under control of the user and received within the audio and/or video generation apparatus via an interface unit. Correspondingly the secondary metadata may be any form of semantic or syntactic metadata.

As will be appreciated those features of the invention which appear in the example embodiments as a data processor or processing units could be implemented in hard ware as well as a software computer program running on an appropriate data processor. Correspondingly those aspects and features of the invention which are described as computer or application programs running on a data processor may be implemented as dedicated hardware. It will therefore be appreciated that a computer program running on a data processor which serves to form an audio and/or video generation apparatus as herein before described is an aspect of the present invention. Similarly a computer program recorded onto a recordable medium which serves to define the method according to the present invention or when loaded onto a computer forms an apparatus according to the present invention are aspects of the present invention.

The invention claimed is:

1. An audio and/or video generation apparatus which is arranged in operation to generate audio and/or video signals representative of an audio and/or video source having a meta data generation tool which is arranged in operation to generate meta data associated with said audio and/or video signals, wherein the type of meta data generated by said meta data generation tool is user selectable, and said meta data generation tool is arranged to generate meta data of a default type in absence of a user selecting from said plurality of meta data types.

2. An audio and/or video generation apparatus as claimed in claim 1, wherein said meta data generation tool is arranged to generate meta data of a plurality of different types, and said meta data generation tool is provided with a user interface for selecting at least one of the plurality of different types of meta data, said meta data being generated in operation in accordance with the content of said audio and/or video signals in accordance with said user selected meta data types.

3. An audio and/or video generation apparatus as claimed in claim 1, wherein said meta data generation tool is arranged to generate meta data in accordance with a plurality of pre-determined meta data selections, each of which specifics at least one of said plurality of different meta data types arranged in a predetermined format, said user interface being arranged to provide the user with a facility for selecting one of the meta data selections for generating said meta data.

4. An audio and/or video generation apparatus as claimed in claim 3, wherein each of said plurality of meta data selections is arranged in accordance with a standard defining the type and format of meta data to be generated with said audio and/or video information.

5. An audio and/or video generation apparatus as claimed in claim 1, comprising a recording/reproducing apparatus which is arranged in operation to record said audio and/or video signals with said meta data on a recordable medium, in form in which said meta data may be recovered separately from said audio/video signals.

6. An audio and/or video generation apparatus as claimed in claim 1, wherein said audio and/or video generation apparatus is a video camera, camcorder, television camera, cinema camera or the like.

7. A meta data generation tool for use in generating metadata in association with an audio and/or visual generation apparatus, said generation tool being arranged in operation to generate meta data associated with audio and/or video signals, wherein the type of meta data generated by said tool is user selectable, and arranged in operation to generate meta data of a default type in absence of a user selecting from said plurality of meta data types.

8. A meta data generation tool as claimed in claim 7, comprising a user interface which is arranged to provide a facility for selecting at least one of a plurality of different types of meta data, said meta data being generated from said audio and/or video signals in accordance with said user selected meta data types.

9. A meta data generation tool as claimed in claim 8, wherein said tool is arranged to generate meta data in accordance with a plurality of pre-determined meta data selections, each of which has at least one of said plurality of meta data types arranged in a predetermined format, said user interface being arranged to provide the user with a facility for selecting one of said meta data selections for generating said meta data.

10. A meta data generation tool as claimed in claim 9, wherein each of said plurality of meta data selections is arranged in accordance with a standard defining the type and format of mete data associated with said audio and/or video information.

11. A method of generating audio and/or video information signals, comprising the steps of:
   identifying the nature of the audio and/or video information signals to be generated,
   selecting appropriate types of meta data to be generated with the audio and/or video signals, and
   generating the meta data of the selected type in association with the audio and/or video information signals, wherein the step of selecting at least one of the plurality of different meta data types comprises the step of:
   providing a default selection having at least one meta data type in absence of a user selecting from said plurality of meta data types.

12. A method as claimed in claim 11, wherein the step of selecting appropriate types of meta data comprises the steps of:
   providing a plurality of different selectable mete data types, and
   selecting at least one of the plurality of different meta data types, said meta data being generated in operation from said audio and/or video signals in accordance with said user selected meta data types.

13. A method as claimed in claim 12, wherein the step of selecting at least one of the plurality of meta data types, comprises the steps of:
   providing a plurality of pre-defined meta data selections, each of which selections specifies at least one of said plurality of meta data types arranged in a predetermined format, and
   selecting one of said pre-defined meta data selections.

14. A method as claimed in claim 13, wherein each of said plurality of meta data selections is arranged in accordance with a standard defining the type and format of meta data associated with said audio and/or video information signals.

15. A computer program providing computer executable instructions, which when loaded on to a computer configures said computer to operate as an audio and/or video generation apparatus as claimed in claim 1.

16. A computer program providing computer executable instructions, which when loaded on to a computer configures said computer to operate as a meta data generation tool as claimed in claim 7.

17. A computer program having computer executable instructions, which when loaded on to a computer causes the computer to perform the method according to claim 11.

18. A computer program product having a computer readable medium having recorded thereon information signals representative of the computer program claimed in claim 15.

* * * * *

UNITED STATES PATENT AND TRADEMARK OFFICE
CERTIFICATE OF CORRECTION

PATENT NO. : 7,123,816 B2  
APPLICATION NO. : 09/795538  
DATED : October 17, 2006  
INVENTOR(S) : Mark J. McGrath et al.

Page 1 of 1

It is certified that error appears in the above-identified patent and that said Letters Patent is hereby corrected as shown below:

In the Claims

In column 12, line 7, after "arranged", insert --when--;

In column 12, line 9, after "arranged", insert --when--;

In column 12, line 11, change "the" to --a--;

In column 12, line 14, change "said" to --a--;

In column 12, line 51, after "arranged", insert --when--;

In column 12, line 53, change "the" to --a--;

In column 12, line 54, after "arranged", insert --when--;

In column 12, line 56, change "said" to --a--;

In column 13, line 15, delete "the";

In column 13, line 17, change "the" to --a--.

Signed and Sealed this  
Fourteenth Day of April, 2015

Michelle K. Lee  
*Director of the United States Patent and Trademark Office*